United States Patent [19]

Illian et al.

[11] Patent Number: 5,876,628
[45] Date of Patent: *Mar. 2, 1999

[54] COMPOUNDS FOR USE IN LIQUID-CRYSTAL COMPOSITION

[75] Inventors: Gerhard Illian, Tokyo, Japan; Hubert Schlosser, Glashütten; Ingrid Müller, Niedernhausen, both of Germany; Thoshiaki Nonaka, Iruma, Japan; Kazuya Nagao, Kawagoe, Japan; Ayako Takeichi, Tokorazawa, Japan; Hidenori Fujiwara, Kakegawa, Japan; Rainer Wingen, Hattersheim, Germany

[73] Assignee: Hoechst Aktiengesellschaft, Frankfurt, Germany

[ * ] Notice: The term of this patent shall not extend beyond the expiration date of Pat. No. 5,445,763.

[21] Appl. No.: 535,029

[22] PCT Filed: May 2, 1994

[86] PCT No.: PCT/EP94/01397

§ 371 Date: Oct. 18, 1995

§ 102(e) Date: Oct. 18, 1995

[87] PCT Pub. No.: WO94/26720

PCT Pub. Date: Nov. 24, 1994

[30] Foreign Application Priority Data

May 6, 1993 [JP] Japan ..................... 5-105640

[51] Int. Cl.$^6$ .......................... C09K 19/30; C09K 19/34; C07D 239/02; C07D 211/72
[52] U.S. Cl. .................. 252/299.63; 252/299.01; 252/299.61; 252/299.66; 252/299.67; 544/298; 544/334; 546/290; 546/339; 546/345; 548/136; 548/146; 549/29; 549/369

[58] Field of Search ............... 252/299.01, 299.61, 252/299.63, 299.62, 299.64, 299.65, 299.66, 299.67; 544/242, 298, 334; 546/290, 339, 345, 346; 548/136, 146; 549/29, 369

[56] References Cited

U.S. PATENT DOCUMENTS

| | | | |
|---|---|---|---|
| 5,384,071 | 1/1995 | Gray et al. | 252/299.63 |
| 5,445,763 | 8/1995 | Schlosser et al. | 252/299.63 |
| 5,460,749 | 10/1995 | Terada et al. | 252/299.61 |
| 5,468,421 | 11/1995 | Matsui et al. | 252/299.63 |
| 5,679,792 | 10/1997 | Escher et al. | 544/298 |

FOREIGN PATENT DOCUMENTS

| | | |
|---|---|---|
| 0 541 081 | 5/1993 | European Pat. Off. . |
| 0 552 658 | 7/1993 | European Pat. Off. . |
| 0 573 878 | 12/1993 | European Pat. Off. . |
| 0 606 090 | 7/1994 | European Pat. Off. . |

*Primary Examiner*—Shean C. Wu
*Attorney, Agent, or Firm*—Frommer Lawrence & Haug LLP

[57] ABSTRACT

Ferroelectric liquid crystal mixtures containing compounds of the formula (I):

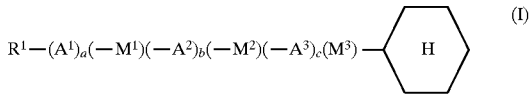

wherein $R^1$ is, for example, a straight-chain or branched alkyl radical having 1 to 22 carbon atoms, in which one —$CH_2$— group may be replaced by —O— or —CO—O—.

9 Claims, No Drawings

COMPOUNDS FOR USE IN LIQUID-CRYSTAL COMPOSITION

BACKGROUND OF THE INVENTION

The present invention relates to a novel compound for use in liquid-crystal compositions.

DESCRIPTION OF THE RELATED ART

In particular in the last decade, liquid crystals have been introduced into various technical areas where electro-optical and display device properties are required (for example, in watch, calculator and typewriter displays). These display devices are based on the dielectric alignment effects in the nematic, cholesteric and/or smectic phases of the liquid-crystalline compounds, where, caused by the dielectric anisotropy, the molecular long axes of the compounds adopt a preferred alignment in an applied electric field. The conventional response times in these display devices are too long for many other potential areas of application of liquid crystals. This disadvantage is particularly noticeable if a large number of pixels have to be addressed. The production costs of equipment containing relatively large screen areas are then generally too high.

In addition to nematic and cholesteric liquid crystals, optically active smectic liquid-crystal phases have also been increasing in importance for a few years.

Clark and Lagerwall have been able to show that the use of ferroelectric liquid-crystal systems in very thin cells give electro-optical switch or display elements which have response times faster by a factor of up to 1000 compared with conventional TN ("twisted nematic") cells (cf., for example, Lagerwall et al., "Ferroelectric Liquid Crystals for Displays", SID Symposium, October Meeting 1985, San Diego, Calif., USA). Due to these and other favorable properties, for example, the possibility for bistable switching and the contrast which is virtually independent of the viewing angle, FLCs are fundamentally very suitable for the above-mentioned areas of application, for example, via matrix addressing. Due to their high contrast and speed, ferroelectric liquid crystals are also particularly suitable in the area of spatial light modulators (cf, for example, U. Efron in "Spatial Light Modulators and Applications", SPIE, Vol. 1150, p. 46 ff).

Ferroelectric properties are expressed in liquid crystals having a phase called a smectic phase represented by a smectic C phase. Compounds having a smectic phase are described in, for example, G. W. Gray et al., Mol. Cryst. Liq. Cryst., Vol. 37, 157–188 (1976). The working temperature and the storage temperature of such liquid-crystal display devices are restricted by the temperatures range of a smectic C phase. Hence ferroelectric liquid crystals having a smectic C phase in a temperature range of −20° C. to +70° C. are desired.

The above requirements can only be satisfied by mixing a plurality of components. In addition, a material which can reduce the melting point and raise the upper limit of the phase transition temperature of a smectic C phase is always required. Compounds bearing a very short alkyl or alkyloxy radical on only one side of the molecule tend to have a nematic phase. It has been an established technique in the art to use such compounds as a component of nematic liquid crystal compositions (Japanese Patent Public Disclosure No. 148282/1986 and No. 003451/1980). However, they have not been considered to be useful for ferroelectric liquid-crystal compositions.

SUMMARY OF THE INVENTION

Accordingly, the object of the present invention is to provide a compound capable of broadening the temperature range of a smectic C phase and to provide a liquid-crystal composition containing the compounds.

Surprisingly, it has now been found that compounds which include as a terminal group a cyclohexyl group having no side chains have a smectic C phase and are useful for broadening the temperature range of the smectic C phase and reducing the melting point of smectic liquid-crystal compositions and ferroelectric liquid crystals.

The present invention relates to compounds of the formula (I):

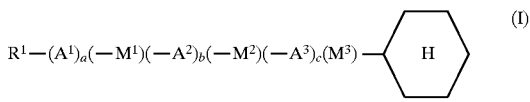

in which the symbols and indices have the following meanings:

$R^1$ is a straight-chain or branched alkyl radical having 1 to 22 carbon atoms (with or without an asymmetrical carbon atom) in which, in addition, it is possible for one or two non-adjacent —$CH_2$— groups to be replaced by —O—, —S—, —CO—, —CO—O—, —O—CO—, —CO—S—, —S—CO—, —O—CO—O—, —CH=CH—, —C≡C—,

or —$Si(CH_3)_2$—, and in which, in addition, one or more hydrogen atoms of the alkyl radical may be substituted by F, Cl, Br or CN, or is one of the chiral groups below:

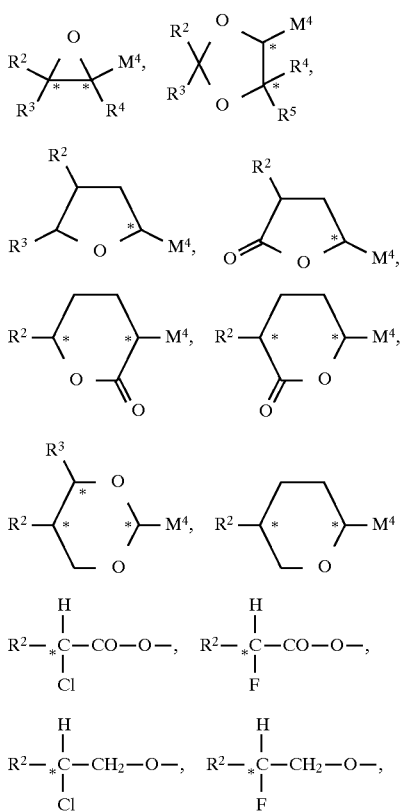

-continued

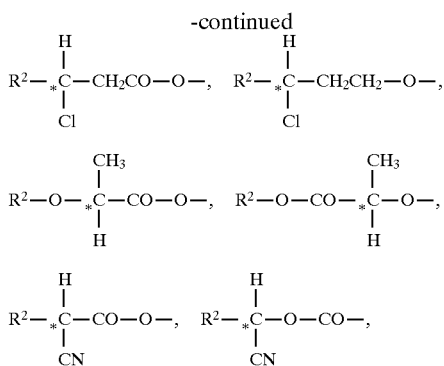

wherein,
$R^2$, $R^3$, $R^4$ and $R^5$, independently of one another, are H or a straight-chain or branched alkyl radical having 1 to 22 carbon atoms in which, in addition, it is possible for one or two non-adjacent —CH$_2$— groups to be replaced by —O—, —S—, —CO—, —CO—O—, —O—CO—, —S—CO—, —O—CO—O—, —CH=CH—, —C≡C—,

or —Si(CH$_3$)$_2$—, or $R^2$ and $R^3$ together may alternatively be —(CH$_2$)$_4$— or —(CH$_2$)$_5$— if they are bonded as substituents to a dioxolane system; and
$M^4$ is —CH$_2$—O—, —O—CH$_2$—, —CO—O—, —O—CO— or a single bond;
$A^1$, $A^2$ and $A^3$ are identical or different and are 1,4-phenylene, in which one or two hydrogen atoms may be replaced by F, Cl and/or CN, pyrazine-2,5-diyl, pyridazine-3,6-diyl, pyridine-2,5-diyl or pyrimidine-2,5-diyl, in which one or two hydrogen atoms may be replaced by F, trans-1,4-cyclohexylene, in which one or two hydrogen atoms may be replaced by —CN and/or —CH$_3$, 1,3,4-thiadiazole-2,5-diyl, 1,3-dioxane-2,5-diyl, 1,3-dithiane-2,5-diyl, 1,3-thiazole-2,4-diyl, 1,3-thiazole-2,5-diyl, thiophene-2,4-diyl, thiophene-2,5-diyl, piperazine-1,4-diyl, piperazine-2,5-diyl or naphthalene-2,6-diyl;
$M^1$ and $M^2$ are identical or different and are a single bond, —O—, —S—, —CO—, —CO—O—, —O—CO—, —CO—S—, —S—CO—, —O—CO—O—, —CH$_2$—O—, —O—CH$_2$—, —CH$_2$CH$_2$—, —CH=CH— or —C≡C—;
$M^3$ is a single bond or a straight-chain or branched alkyl radical having 1 to 16 carbon atoms in which, in addition, it is possible for one or two non-adjacent —CH$_2$— groups to be replaced by —O—, —S—, —CO—, —CO—O—, —O—CO—, —CO—S—, —S—CO—, —O—CO—O—, —CH=CH—, —C≡C—or —Si(CH$_3$)$_2$—, and in which, in addition, one or more hydrogen atoms of the alkyl radical may be substituted by F, Cl, Br or CN, with the proviso that $M^3$ is not —O—CO—CH$_2$CH$_2$—;
a, b and c are zero or one, with the proviso that the sum a+b+c is 2 or 3; and
* is a chiral center;
provided however that when $A^1$ and $A^2$ are 1,4-phenylene, $M^1$ and $M^2$ are a single bond, c is zero and $M^3$ is —CO—O—, then $R^1$ is not C$_8$H$_{17}$—O—.

The present invention further relates to liquid-crystal compositions containing at least one compound of the formula (I) or a mixture thereof.

DESCRIPTION OF THE PREFERRED EMBODIMENTS

Preference is given to the compounds of the formula (I) in which the symbols and indices have the following meanings:
$R^1$ is a straight-chain or branched alkyl radical having 1 to 22 carbon atoms (with or without an asymmetrical carbon atom) in which, in addition, it is possible for one or two non-adjacent —CH$_2$— groups to be replaced by —O—, —S—, —CO—, —CO—O—, —O—CO—, —O—CO—O—, —CH=CH—, —C≡C—,

or —Si(CH$_3$)$_2$—, or is one of the chiral groups below:

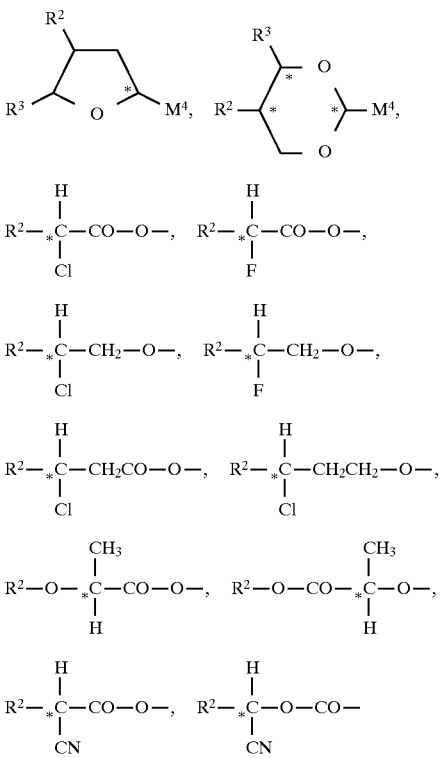

wherein,
$R^2$, $R^3$, $R^4$ and $R^5$, independently of one another, are H or a straight-chain or branched alkyl radical having 1 to 22 carbon atoms in which, in addition, it is possible for one or two non-adjacent —CH$_2$— groups to be replaced by —O—, —S—, —CO—, —CO—O—, —O—CO—, —CO—S—, —S—CO—, —O—CO—O—, —CH=CH—, —C≡C—,

or —Si(CH$_3$)$_2$—, or $R^2$ and $R^3$ together may alternatively be —(CH$_2$)$_4$— or —(CH$_2$)$_5$— if they are bonded as substituents to a dioxolane system;
$A^1$, $A^2$ and $A^3$ are identical or different and are 1,4-phenylene, in which one or two hydrogen atoms may be replaced by F, pyrazine-2,5-diyl, pyridazine-3,6-diyl, pyridine-2,5-diyl, pyrimidine-2,5-diyl, trans-1, 4-cyclohexylene, 1,3,4-thiadiazole-2,5-diyl, 1,3-dioxane-2,5-diyl or naphthalene-2,6-diyl;

$M^1$ and $M^2$ are identical or different and are a single bond, —O—, —CO—, —CO—O—, —O—CO—, —CH$_2$—O—, —O—CH$_2$—, —CH$_2$CH$_2$—, —CH=CH— or —C≡C—;

$M^3$ is a single bond or a straight-chain or branched alkyl radical having 1 to 16 carbon atoms in which, in addition, it is possible for one or two non-adjacent —CH$_2$— groups to be replaced by —O—, —CO—, —CO—O—, —O—CO— or —O—CO—O—, and in which, in addition, one or more hydrogen atoms of the alkyl radical may be substituted by F, Cl, Br or CN; and a, b and c are zero or one, with the proviso that the sum a+b+c is 2 or 3.

Particular preference is given to the compounds of the formula (I) in which symbols and indices have the following meanings:

$R^1$ is a straight-chain or branched alkyl radical having 1 to 22 carbon atoms (with or without an asymmetrical carbon atom) in which, in addition, it is possible for one or two non-adjacent —CH$_2$— groups to be replaced by —O—, —CO—, —CO—O—, —O—CO—, —CH=CH—, —C≡C—,

, or —Si(CH$_3$)$_2$—;

$A^1$, $A^2$ and $A^3$ are identical or different and are 1,4-phenylene, in which one or two hydrogen atoms may be replaced by F, pyrazine-2,5-diyl, pyridine-2,5-diyl, pyrimidine-2,5-diyl, trans-1,4-cyclohexylene, 1,3,4-thiadiazole-2,5-diyl, naphthalene-2,6-diyl or 1,3-dioxane-2,5-diyl;

$M^1$ and $M^2$ are identical or different and are a single bond, —O—, —CO—O—, —O—CO—, —CH$_2$—O—, —O—CH$_2$—, —CH$_2$CH$_2$—, —CH=CH— or —C≡C—;

$M^3$ is a single bond, —CO—O—, —O—CO—, —O—CO—C$_n$H$_{2n}$— or —O—C$_n$H$_{2n}$— (wherein n is an integer from 1 to 10); and a, b and c are zero or one, with the proviso that the sum a+b+c is 2 or 3.

Of the compounds of the formula (I) according to the present invention, the followings are particularly preferable:

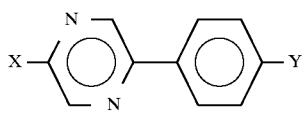

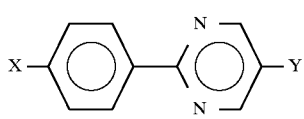

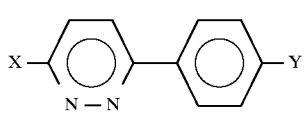

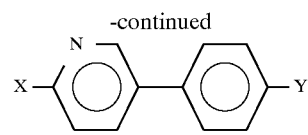

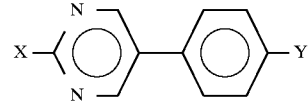

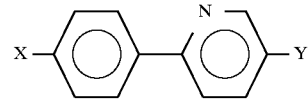

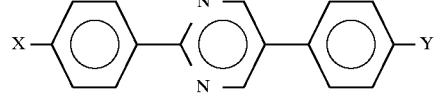

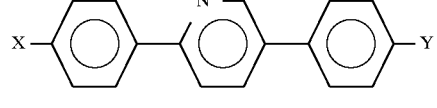

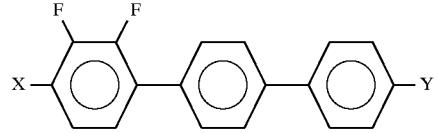

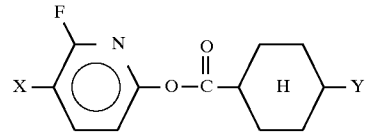

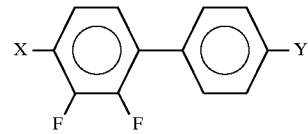

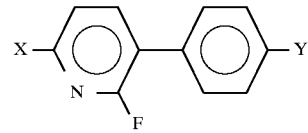

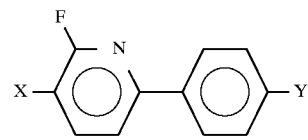

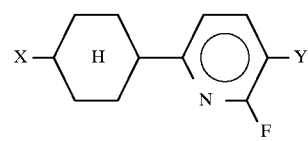

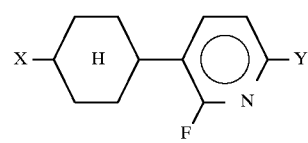

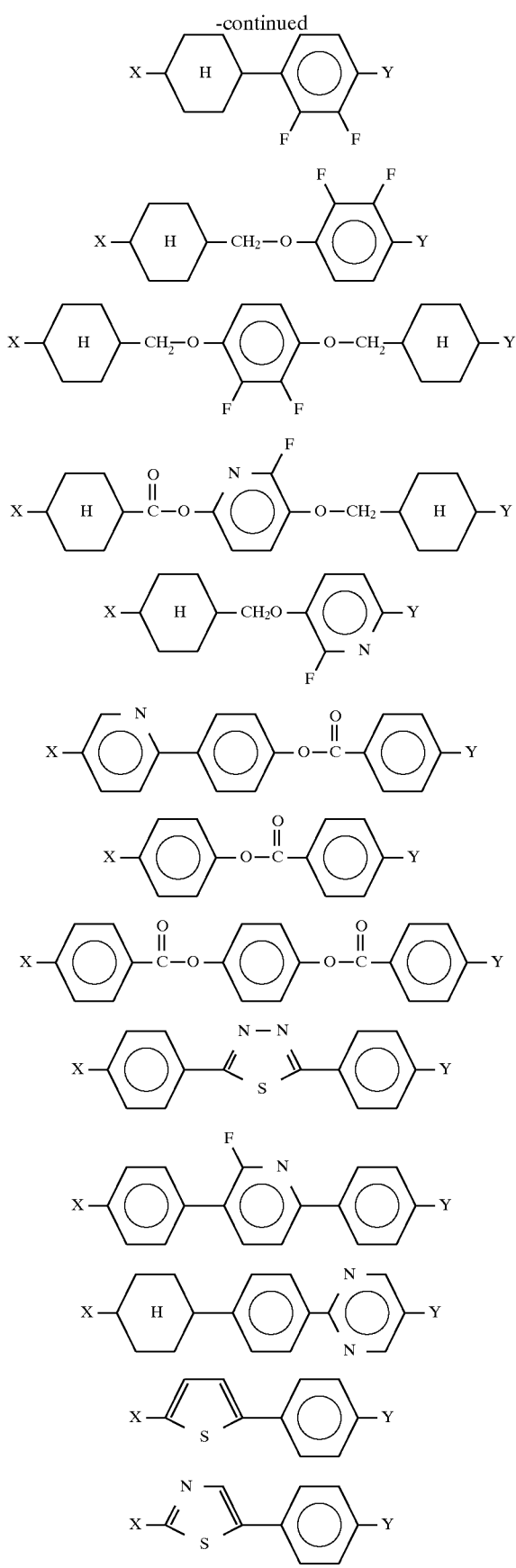
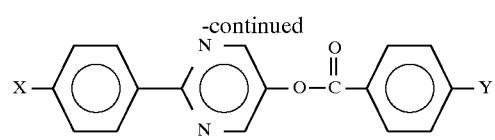
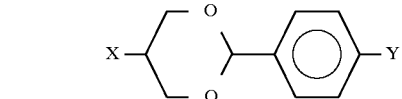
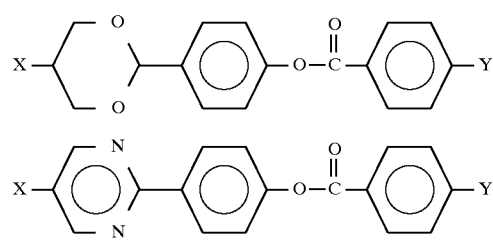
in which either of X and Y is a straight-chain or branched alkyl radical having 1 to 22 carbon atoms, wherein one —CH$_2$— group may be replaced by —O—,
,
—CH=CH—, —CO—O— or —Si(CH$_3$)$_2$—; and the other is
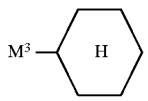
wherein M$^3$ is a single bond, —CO—O—, —O—CO—, —O—CO—C$_n$H$_{2n}$— or —O—C$_n$H$_{2n}$— (wherein n is an integer from 1 to 10).
Very particular preference is given to the following compounds:
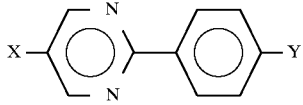
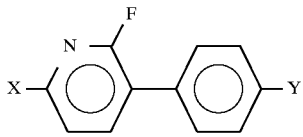
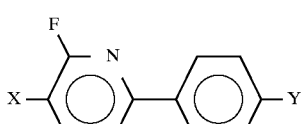

-continued

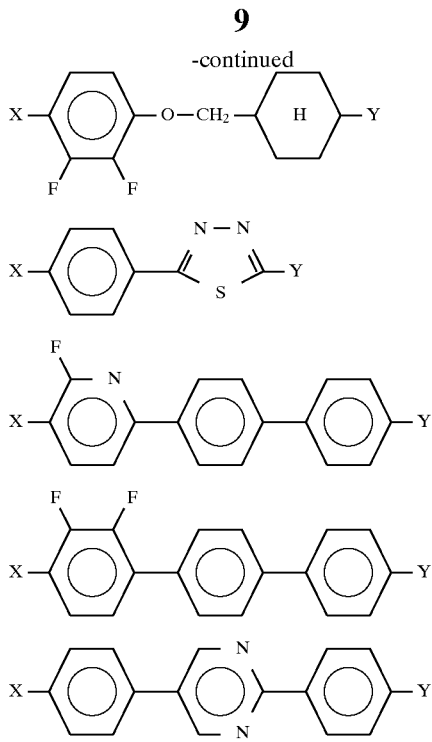

in which either of X and Y is a straight-chain or branched alkyl radical having 1 to 22 carbon atoms, wherein one —CH$_2$— group may be replaced by —O— or —CO—O—; and
the other is

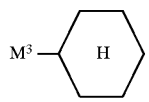

wherein M$^3$ is —O—CO— or —O—CH$_2$—,
and the compounds of the formula (I) wherein:

R$^1$ is a straight-chain or branched alkyl radical having 1 to 22 carbon atoms, in which one —CH$_2$— group may be replaced by —O— or —CO—O—; and
the group —(A$^1$)$_a$(—M$^1$)(—A$^2$)$_b$(—M$^2$)(—A$^3$)$_c$(—M$^3$)— is any one of the following groups:

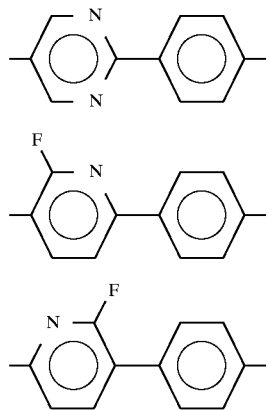

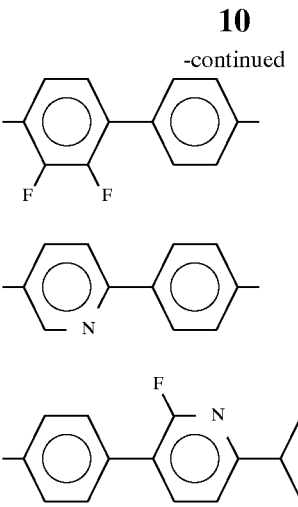

The compound of the formula (I) according to the present invention is suitable as a component for liquid-crystal compositions, in particular ferroelectric liquid-crystal compositions. The liquid-crystal compositions may contain from 0.01 to 60% by weight, preferably from 0.1 to 40% by weight, particularly preferably from 0.1 to 20% by weight, of the compounds according to the present invention. The other constituents are preferably selected from known compounds having nematic, cholesteric and/or smectic phases; these include, for example, Schiff's bases, biphenyls, terphenyls, phenylcyclohexanes, cyclohexylbiphenyls, N-, S- or O-containing heterocyclic compounds, for example pyrimidines, cinnamic acid esters, cholesterol esters or various bridged, polycyclic esters of p-alkylbenzoic acids which have terminal polar groups.

Surprisingly, it has now been found that the addition of compounds of the formula (I) can considerably broaden the temperature range in a lower temperature region of smectic C compositions or the smectic C phase of ferroelectric liquid-crystal compositions.

These mixtures can in turn be used in electro-optical or fully optical elements, for example, display elements, switching elements, light modulators, elements for image processing, signal processing or generally in the area of non-linear optics.

The present invention is described in greater detail by means of Examples below.

The phase transition temperatures were determined with the aid of a polarizing microscope from the changes in texture on heating. By contrast, the melting point was determined using a DSC instrument. The phase transition temperatures between the phases isotropic (I)

nematic (N or N*)

smectic-C (S$_C$ or S$_C$*)

smectic-A (S$_A$)

crystalline (X)

are given in °C., and the values are between the phase designations in the phase sequence.

EXAMPLE 1

4-(5-Octyloxypyrimidine-2-yl)phenyl cyclohexylcarboxylate

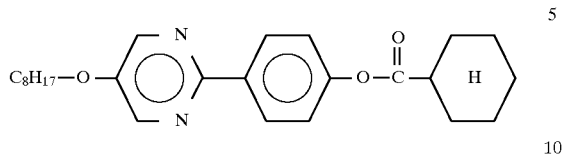

1.00 g of 4-(5-octyloxypyrimidine-2-yl) was dissolved in 12 ml of pyridine, and the solution was cooled on an ice bath. 4 g of cyclohexyl carbonylchloride was slowly added dropwise to the solution. The solution was left at room temperature overnight and poured into ice water. After the solution was adjusted to pH 2 with concentrated hydrochloric acid, an ester was precipitated. The solution was filtered and recrystallized from n-hexane to give 600 mg of 4-(5-octyloxypyrimidine-2-yl)phenyl cyclohexylcarboxylate.

The compound has the following phase sequence:
X 107 I

EXAMPLE 2

4-[2-(4'-Octyloxyphenyl)pyrimidine-5-yl]phenyl cyclohexylcarboxylate

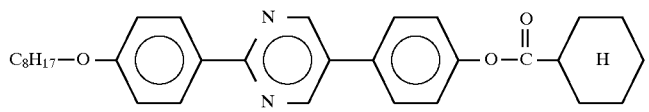

The synthesis was carried out analogously to Example 1.
The compound has the following phase sequence:
X 154.9 I

EXAMPLE 3

4-(5-Octylpyrimidine-2-yl)phenyl cyclohexylcarboxylate

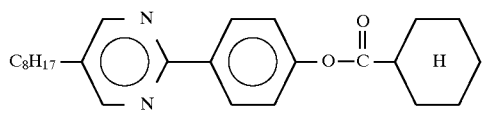

The synthesis was carried out analogously to Example 1.
The compound has the following phase sequence:
X 96.7 I

EXAMPLE 4

2-(4-Octyloxyphenyl)pyrimidine-5-yl 4-cyclohexylphenylcarboxylate

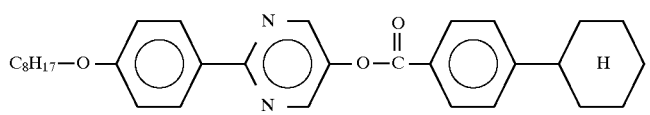

The synthesis was carried out analogously to Example 1.

The compound has the following phase sequence:

X 108 (73) N 206 I

EXAMPLE 5

4-(5-Octyl-1,3-dioxane-2-yl)phenyl cyclohexanecarboxylate

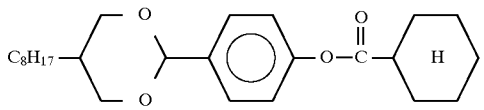

The synthesis was carried out analogously to Example 1.

The compound has the following phase sequence:

X 82 (22.5) $S_2$ 61 $S_1$ 75 I

EXAMPLE 6

4-(5-Octyl-1,3-dioxane-2-yl)phenyl 4-cyclohexylphenylcarboxylate

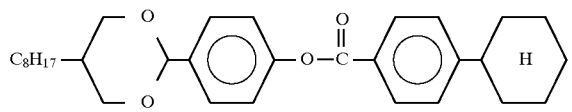

The synthesis was carried out analogously to Example 1.

The compound has the following phase sequence:

$X_2$ 99 X 106 (78) N 169 I

EXAMPLE 7

2-(4-Cyclohexylphenyl)pyrimidine-5-yl undecanoate

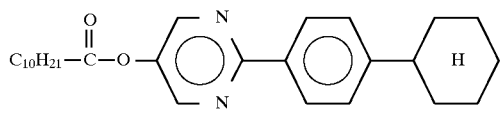

The synthesis was carried out analogously to Example 1.
The compound has the following phase sequence:
X 99.9 (88) I

EXAMPLE 8

2-(4-Cyclohexylphenyl)pyrimidine-5-yl heptanoate

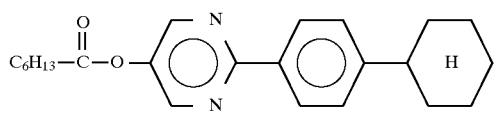

The synthesis was carried out analogously to Example 1.
The compound has the following phase sequence:
X 109.3 (100) I

EXAMPLE 9

4-(5-Octyloxypyrimidine-2-yl)phenyl 4-cyclohexylphenylcarboxylate

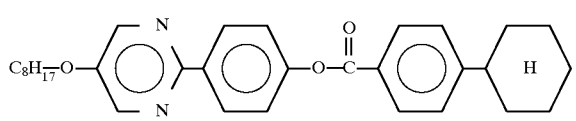

The synthesis was carried out analogously to Example 1.
The compound has the following phase sequence:
X 144 (122) N 200 I

EXAMPLE 10

4-(5-Octylpyridine-2-yl)phenyl 4-cyclohexylphenylcarboxylate

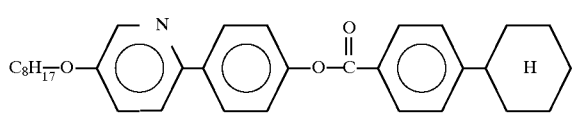

The synthesis was carried out analogously to Example 1.
The compound has the following phase sequence:
X 133 (117) N 182 I

EXAMPLE 11

4'-Octyloxylphenyl 4-cyclohexylbenzoate

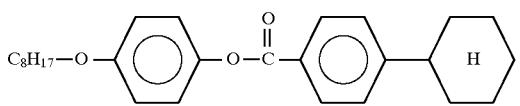

The synthesis was carried out analogously to Example 1.

The compound has the following phase sequence:

X 92 (78) I

EXAMPLE 12

Hydroquinone 4-octyloxyphenylcarboxylate 4-cyclohexylphenylcarboxylate diester

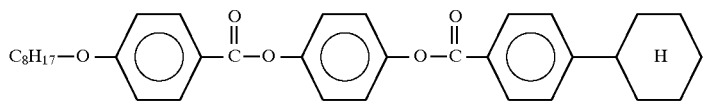

The synthesis was carried out analogously to Example 1.

The compound has the following phase sequence:

X 146 (114) N 212 I

EXAMPLE 13

2-(4-Cyclohexylphenyl)-5-(4-nonyloxyphenyl)-1,3,4-thiadiazole

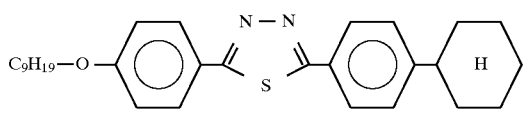

The synthesis was carried out analogously to the method described by K. Dimitrooa, F. Hauschild, H. Azschke and H. Schubert in Journal für Prakt. Chemie, Vol. 322 (1980), page 933.

The compound has the following phase sequence:

X 126 $S_C$ 146 N 186 I

EXAMPLE 14

2-Cyclohexyl-5-(4-nonyloxyphenyl)-1,3,4-thiadiazole

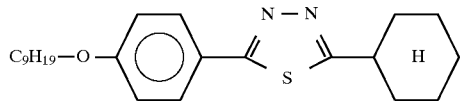

The synthesis was carried out analogously to Example 13.
The compound has the following phase sequence:
$X_2$ 77 X 86 $S_A$ 67 I

EXAMPLE 15

2-[4'-(4-Cyclohexyl-n-butyloxy)phenyl]-5-octylpyrimidine

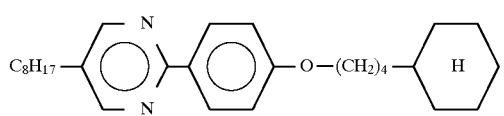

The synthesis was carried out according to the method described in European Patent No. 0318423 and No. 0398155.
The compound has the following phase sequence:
X 42 (11) $S_C$ 41 $S_A$ 43 N 51 I

EXAMPLE 16

2-[4-(6-Cyclohexyl-n-hexyloxy)phenyl]-5-octylpyrimidine

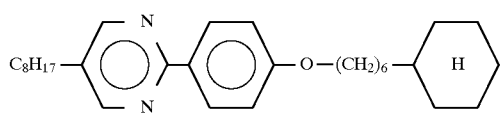

The synthesis was carried out analogously to Example 15.
The compound has the following phase sequence:
X 56 (10) $S_C$ 51 $S_A$ 52 N 57 I

EXAMPLE 17

2-[4'-(9-Cyclohexyl-n-nonyloxy)phenyl]-5-octylpyrimidine

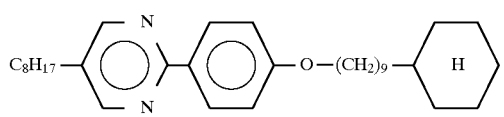

The synthesis was carried out analogously to Example 15.
The compound has the following phase sequence:
X 73 (67) N 60 I

EXAMPLE 18

2-[4'-(9-Cyclohexyl-n-nonyloxy)phenyl]-5-dodecylpyrimidine

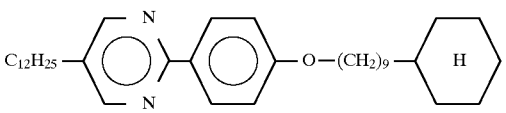

The synthesis was carried out analogously to Example 15.
The compound has the following phase sequence:
X 78 (65) $S_C$ 75 I

EXAMPLE 19

2-[4-(4-Cyclohexylbutyloxy)phenyl]-5-octyloxypyrimidine

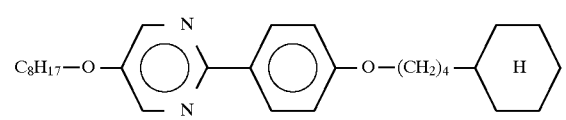

The synthesis was carried out analogously to Example 15.
The compound has the following phase sequence:
X 71 (51) $S_C$ 79 $S_A$ 81 N 84 I

EXAMPLE 20

2-[4-(4-Cyclohexylhexyloxy)phenyl]-5-octyloxypyrimidine

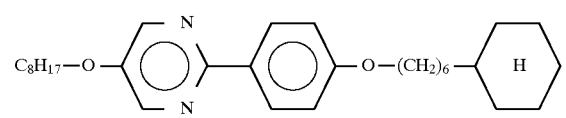

The synthesis was carried out analogously to Example 15.
The compound has the following phase sequence:
X 55 (41) $S_C$ 81 $S_A$ 87 N 88 I

EXAMPLE 21

2-[4-(9-Cyclohexyl-n-nonyloxy)phenyl]-5-octyloxypyrimidine

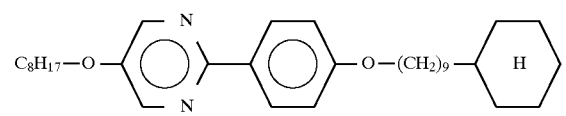

The synthesis was carried out analogously to Example 15.
The compound has the following phase sequence:
X 73 (61) $S_C$ 86 $S_A$ 91 I

EXAMPLE 22

4-(5-Octylpyrimidine-2-yl)phenyl 7-cyclohexylheptoate

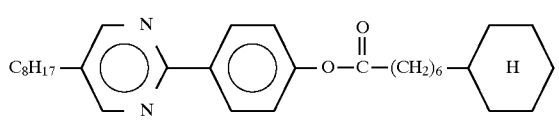

The synthesis was carried out analogously to Example 15.

The compound has the following phase sequence:

$X_2$ 69 X 71 I

EXAMPLE 23

4-(5-Decylpyrimidine-2-yl)phenyl 7-cyclohexylheptoate

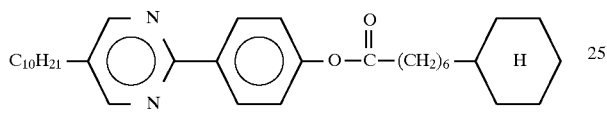

The synthesis was carried out analogously to Example 15.

The compound has the following phase sequence:

$X_2$ 62 (56) X 74 $S_C$ 64 I

EXAMPLE 24

4-(5-Octyloxypyrimidine-2-yl)phenyl 7-cyclohexylheptoate

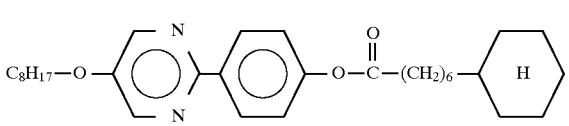

The synthesis was carried out analogously to Example 15.

The compound has the following phase sequence:

X 66 (58) $S_C$ 87 $S_A$ 88 N 90 I

EXAMPLE 25
6-(4-Cyclohexylphenyl-2-fluoro-3-octyloxypyridine)

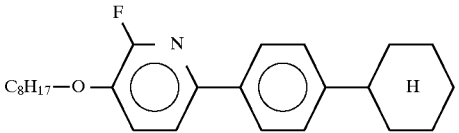

2.2 g (8.3 mmol) of triphenylphosphine and 1.3 ml (8.3 mmol) of diethyl azodicarboxylate were stirred in tetrahydrofuran at 0° C. for half an hour. 1.3 ml (8.3 mmol) of 1-octanol and 1.5 g (5.53 mmol) of 6-(4-cyclohexylphenyl)-2-fluoro-3-hydroxypyridine were added therein and the mixture was stirred at room temperature for 18 hours.

The solution was evaporated to dryness, and the residue was purified by column chromatography. Recrystallization from acetonitrile gave 1.03 g of the titled compound.

The compound has the following phase sequence:

X 86 (65) I

EXAMPLE 26
2-(4-Cyclohexylphenyl)-octyloxypyridine

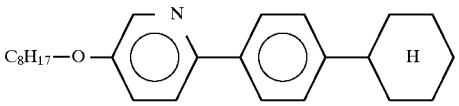

The synthesis was carried out analogously to Example 25.
The compound has the following phase sequence:
X 68 (47) $S_2$ 75 $S_C$ 84 N 89 I

EXAMPLE 27
5-[4-(Cyclohexylmethyloxy)phenyl]-2-(4'-octyloxyphenyl)-pyrimidine

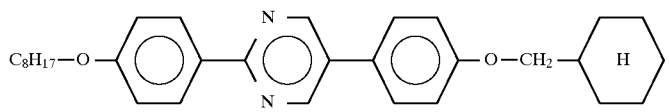

The synthesis was carried out analogously to Example 25.

The compound has the following phase sequence:

X 126 $S_3$ 140 $S_C$ 183 $S_A$ 213 N 214 I

EXAMPLE 28

2-[4-(Cyclohexylmethyloxy)phenyl]-5-octyloxypyrimidine

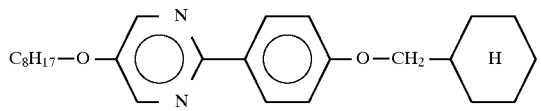

The synthesis was carried out analogously to Example 25.

The compound has the following phase sequence:

X 106 I

EXAMPLE 29

2-(4-Cyclohexylphenyl)-5-dodecyloxypyrimidine

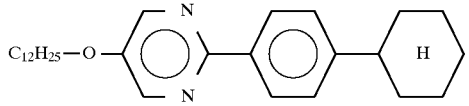

The synthesis was carried out analogously to Example 25.
The compound has the following phase sequence:
$X_1$ 67 (32) $X_2$ 71 (39) $S_C$ 75 $S_A$ 92 I

EXAMPLE 30

2-(4-Cyclohexylphenyl)-5-decyloxypyrimidine

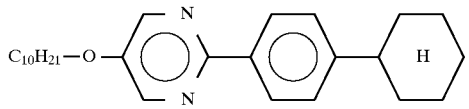

The synthesis was carried out analogously to Example 25.
The compound has the following phase sequence:
X 65 (23) $S_3$ 74 $S_C$ 76 $S_A$ 89 N 89.2 I

EXAMPLE 31

2-(4-Cyclohexylphenyl)-5-octyloxypyrimidine

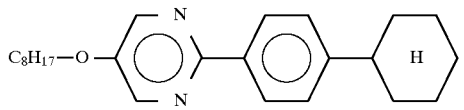

The synthesis was carried out analogously to Example 25.
The compound has the following phase sequence:
$X_1$ 55 $X_2$ 71 (62) $S_2$ 67 $S_A$ 78 N 85 I

EXAMPLE 32

5-(4-Cyclohexylphenyl)-2-octyloxypyrimidine

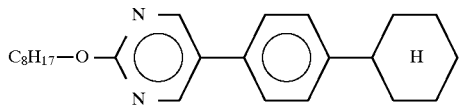

2 g (6.96 mmol) of 5-bromo-2-octylpyrimidine, 1.42 g (6.96 mmol) of 4-cyclohexylbenzeneboronic acid, 1.5 g (14.00 mmol) of sodium carbonate and 0.08 g (0.07 mmol) of tetrakisphenylphosphine paradium were refluxed for 4 hours in 40 ml of toluene, 10 ml of ethanol and 10 ml of water.

The organic phase was separated and evaporated to dryness, and the crude product was purified by column chromatography and recrystallized from acetanilide to give 1.29 of the titled compound.

The compound has the following phase sequence:
X 92.7 (65.4) $S_A$ 79 I

EXAMPLE 33

5-(4-Cyclohexylphenyl)-2-octyloxypyridine

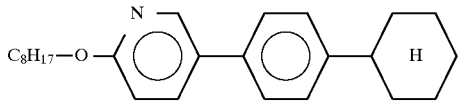

The synthesis was carried out analogously to Example 32.
The compound has the following phase sequence:
X 64 (36.1) $S_B$ 60 I

EXAMPLE 34

2-(4-Cyclohexylphenyl)-5-(4-hexylphenyl)pyrimidine

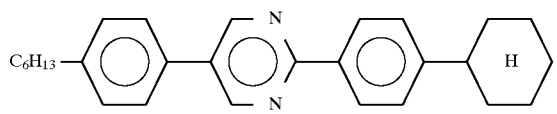

The synthesis was carried out analogously to Example 32.
The compound has the following phase sequence:
X 129.8 (115) $S_3$ 150 $S_C$ 153 $S_A$ 187 N 197 I

EXAMPLE 35

5-[4-(4-Butyldimethylsilyl)-butyloxyphenyl]-2-(4-cyclohexylphenyl)pyrimidine

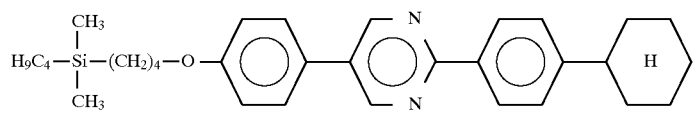

The synthesis was carried out analogously to Example 32.
The compound has the following phase sequence:
X 145.7 (140) $S_1$ 152 I

EXAMPLE 36

5-(4-Cyclohexylphenyl)-2-(4-hexylphenyl)pyrimidine

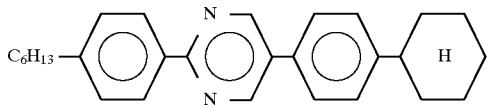

The synthesis was carried out analogously to Example 32.
The compound has the following phase sequence:
X 147 (133) $S_A$ 209 I

EXAMPLE 37

5-(4-Cyclohexylphenyl)-2-(4-octyloxyphenyl)pyrimidine

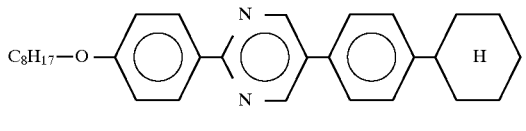

The synthesis was carried out analogously to Example 32.
The compound has the following phase sequence:
X 134 (90) $S_3$ 94 $S_C$ 134 $S_A$ 210 N 219 I

EXAMPLE 38

2-[4-(4-Butyldimethylsilyl)butyloxyphenyl]-5-(4-cyclohexylphenyl)pyrimidine

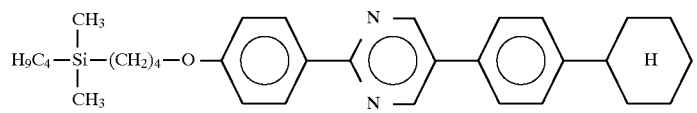

The synthesis was carried out analogously to Example 32.

The compound has the following phase sequence:
X 97 (70) $S_C$ 117 $S_A$ 199 I

EXAMPLE 39

6-(4-Cyclohexylphenyl)-2-fluoro-3-(4-octyloxyphenyl)pyridine

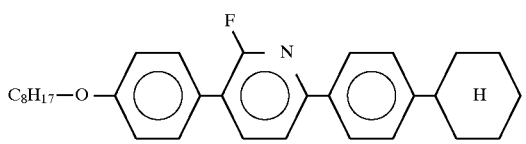

The synthesis was carried out analogously to Example 32.

The compound has the following phase sequence:
X 115 (78) $S_C$ 99 $S_C$ 141 N 187 I

EXAMPLE 40

3-(4-Cyclohexylphenyl)-2-fluoro-6-octyloxypyridine

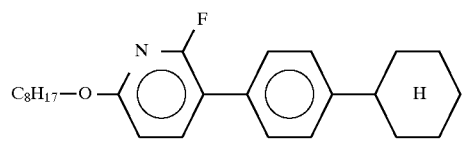

The synthesis was carried out analogously to Example 32.

The compound has the following phase sequence:
X 49 (11) I

EXAMPLE 41

2-(4-Cyclohexylphenyl)-5-(4-octyloxyphenyl)pyrimidine

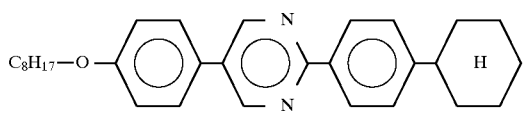

The synthesis was carried out analogously to Example 32.

The compound has the following phase sequence:

X 102 (73) $S_B$ 144 $S_C$ 188 $S_A$ 214 N 217 I

EXAMPLE 42

2-(4-Cyclohexylphenyl)-5-octylpyrimidine

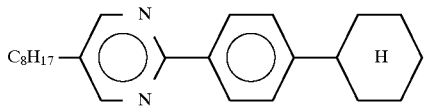

2.9 ml (17 mmol) of 1-bromooctane and 0.51 g (21 mmol) of a Grignard compound were reacted in 50 ml of tetrahydrofuran. The Grignard compound solution was added dropwise to a solution of 3 g (9.5 mmol) of 5-bromo-2-(4-cyclohexylphenyl)-pyrimidine and 0.06 g (0.1 mmol) of 1,3-bis(diphenylphosphine)propane nickel (II) chloride in 65 ml of tetrahydrofuran, and the mixture was stirred at 0° C. for 2 to 4 hours.

3 ml of hydrochloric acid (37% strength) and 50 ml of water were added therein, the organic phase was separated, washed, dried over $Na_2SO_4$, filtered and evaporated to dryness. The product was purified by column chromatography and recrystallized from acetanilide to give 0.83 g of the titled compound.

The compound has the following phase sequence:

$X_1$ 18.5 (5) $X_2$ 69 $S_B$ 76 (71) I

EXAMPLE 43

Trans-5-cyclohexyl-2-[4-(4-pentylcyclohexyl)phenyl]pyrimidine

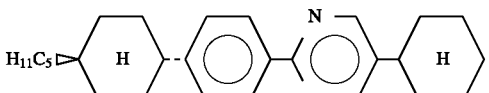

The synthesis was carried out analogously to Example 42.
The compound has the following phase sequence:
X 140 (113) N 214 I
EXAMPLE 44
A ferroelectric liquid-crystal composition (A) containing the compounds (a) and (b) of the present invention comprises the following components (mol %).
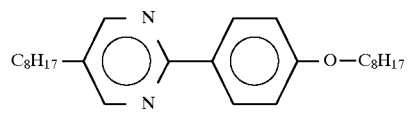 6
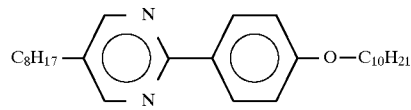 6
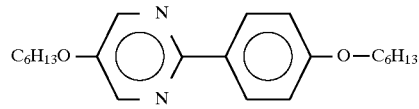 7
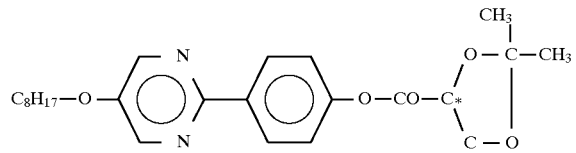 3
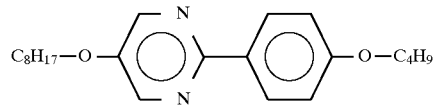 8
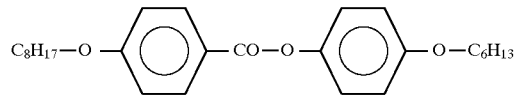 6
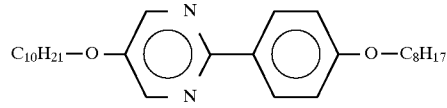 6
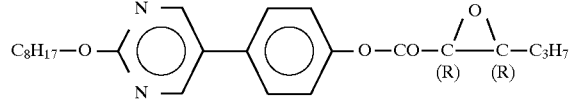 7
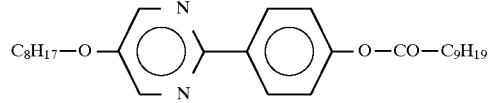 5
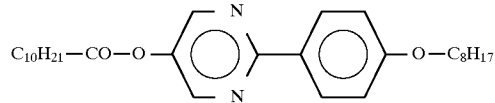 6
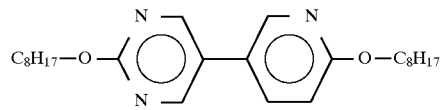 5
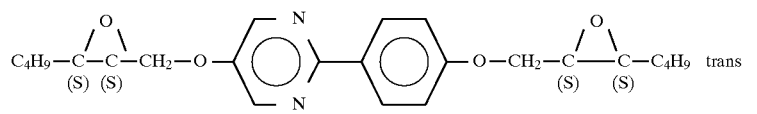 7

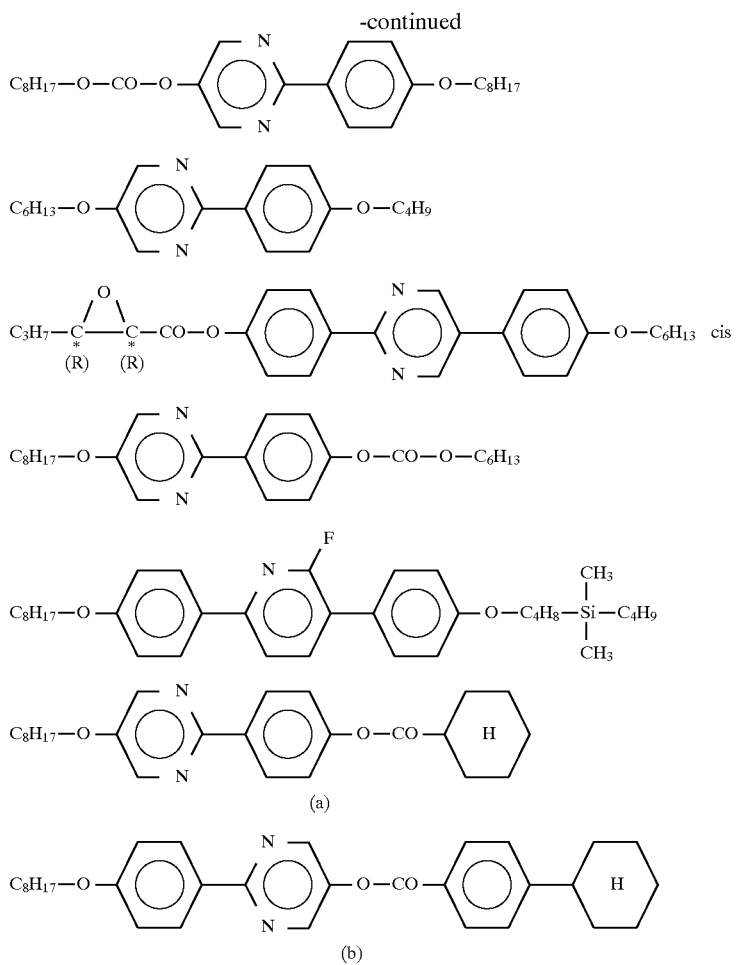

The composition (A) has the following phase sequence:
X −26 $S_C^*$ 70 $S_A$ 73 Ch* 87 I The above example shows that the compound of the present invention gives a very low melting point and a broad temperature range of smectic C phase.

In addition, the composition (A) can be used for ferroelectric liquid-crystal display devices, and switches at a switching speed of 44 μs by means of a dipolar pulse.

EXAMPLE 45

A ferroelectric liquid-crystal composition (B) containing no compounds of the present invention comprises the following components (mol %).

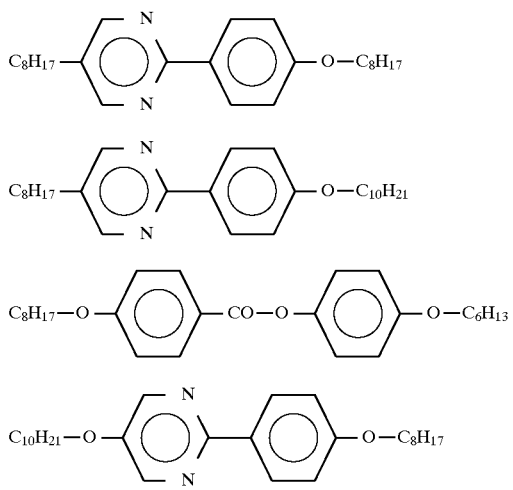

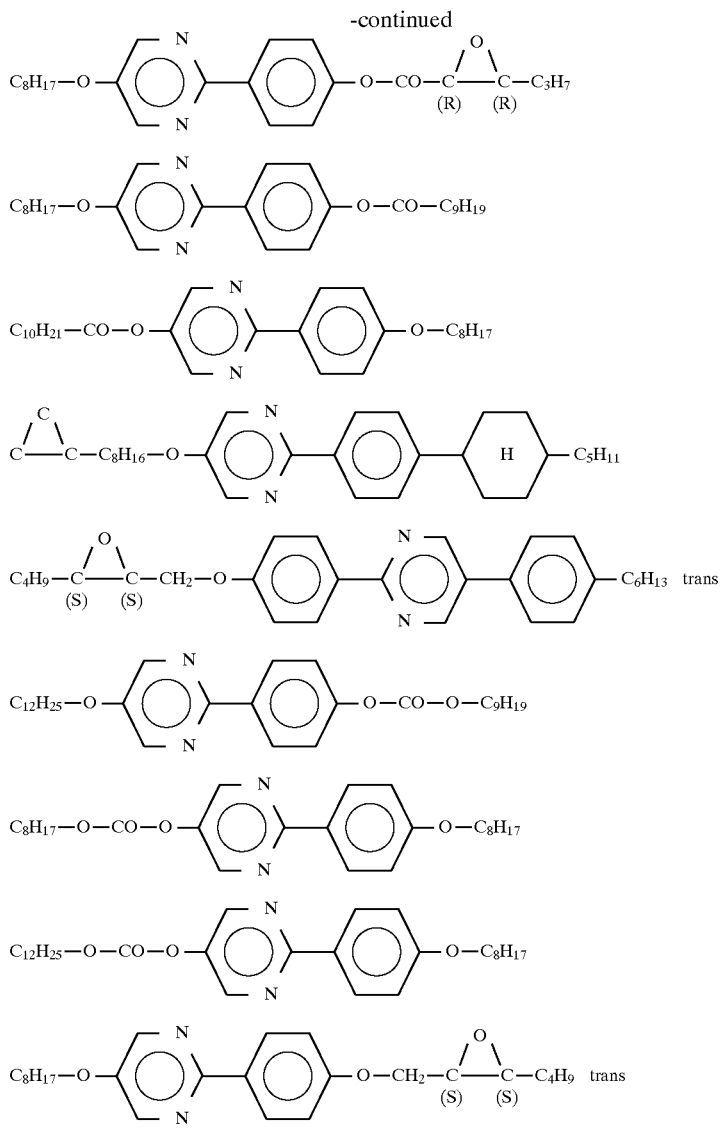

The composition (B) has the following phase sequence:
X -19 $S_C^*$ 76 $S_A$ 85 Ch* 101 I A ferroelectric liquid-crystal composition (C) comprising 94% of the composition (B) and 6% of the compound (c) of the present invention was prepared.

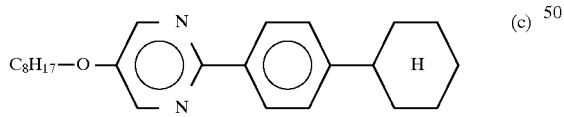

(c)

The composition (C) has the following phase sequence:
X -27 $S_C^*$ 72 $S_A$ 85 Ch* 96 I The melting point was lowered by adding the liquid-crystal compound (c) of the present invention to the ferroelectric liquid-crystal composition (B).

EXAMPLE 46

A ferroelectric liquid-crystal composition (D) containing the compounds of the present invention comprises the following components (mol %).

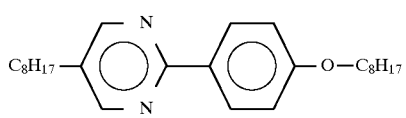

-continued

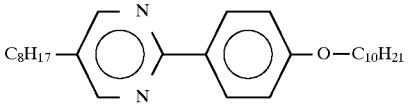
8

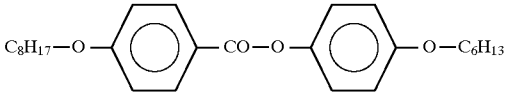
8

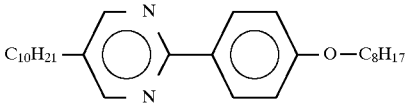
8

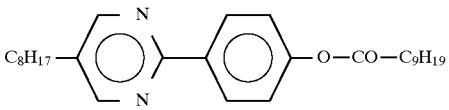
6

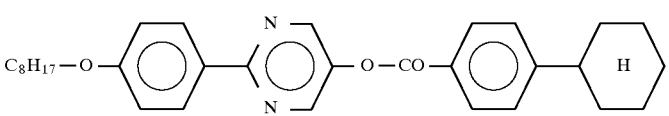
7

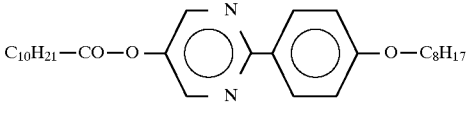
8

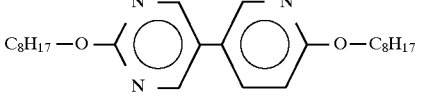
6

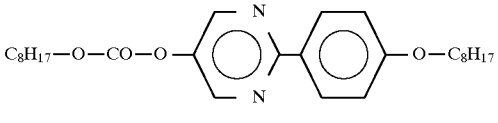
6

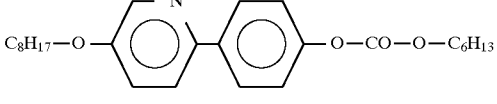
13

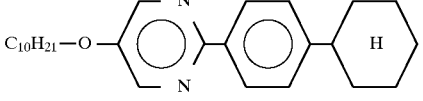
15

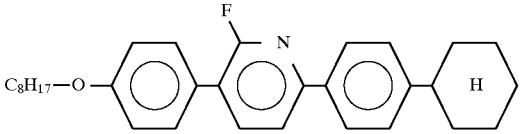
6

The composition (D) has the following phase sequence:

X −22 $S_C$ 74 $S_A$ 83 Ch 88 I

Liquid-crystal compositions (E) and (F) were prepared by adding the compounds of the present invention to the composition (D). The smectic liquid-crystal composition (E) comprises 90% of the composition (D) and 10% of the compound (d) of the present invention.

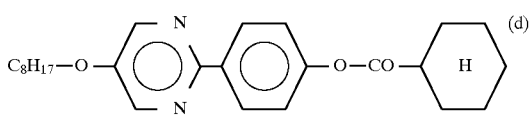 (d)

The composition (E) has the following phase sequence:

X −31 $S_C$ 75 $S_A$ 84 Ch 97 I

On the other hand, the smectic liquid-crystal composition (F) comprises 90% of the composition (D) and 10% of the compound (e) of the present invention.

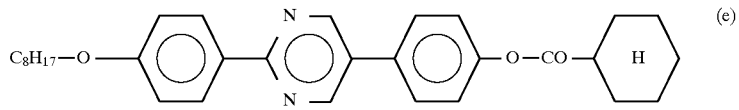
(e)

The composition (F) has the following phase sequence:
X -40 $S_C$ 80 $S_A$ 89 Ch 102 I The melting point was lowered by adding the liquid-crystal compound (d) or (e) according to the present invention to the smectic liquid-crystal composition (D).

EXAMPLE 47

A smectic liquid-crystal composition (G) containing no compounds of the present invention comprises the following components (mol %).

| | | |
|---|---|---|
| 13 | C₈H₁₇—pyridine—phenyl—O—C₈H₁₇ | |
| 12 | C₈H₁₇—pyridine—phenyl—O—C₁₀H₂₁ | |
| 13 | C₈H₁₇—O—phenyl—CO—O—phenyl—O—C₆H₁₃ | |
| 12 | C₁₀H₂₁—O—pyrimidine—phenyl—O—C₈H₁₇ | |
| 10 | C₈H₁₇—pyrimidine—phenyl—O—CO—C₉H₁₉ | |
| 11 | C₁₀H₂₁—CO—O—pyrimidine—phenyl—O—C₈H₁₇ | |
| 10 | C₈H₁₇—O—CO—O—pyrimidine—phenyl—O—C₈H₁₇ | |

-continued

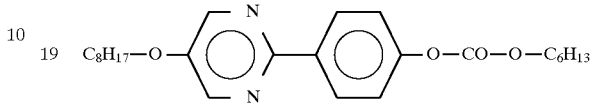

19   C₈H₁₇—O—pyrimidine—phenyl—O—CO—O—C₆H₁₃

The composition (G) has the following phase sequence:
X -7 $S_C$ 68 $S_A$ 71 Ch 85 I Liquid-crystal compositions (H) and (I) were prepared by adding the compound (f) or (g) of the present invention to the composition (G). The smectic liquid-crystal composition (H) comprises 90% of the composition (G) and 10% of the compound (f) of the present invention.

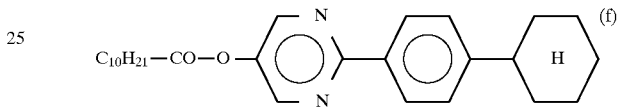
(f)

The composition (H) has the following phase sequence:
X -13 $S_C$ 72 $S_A$ 77 Ch 86 I On the other hand, the smectic liquid-crystal composition (I) comprises 80% of the composition (G) and 20% of the compound (g) of the present invention.

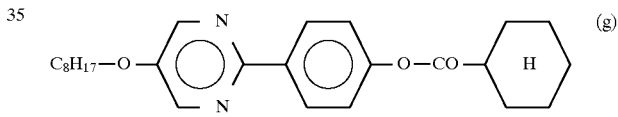
(g)

The composition (I) has the following phase sequence:
X -14 $S_C$ 69 $S_A$ 76 C 87 I The melting point was lowered by adding the liquid-crystal compound (f) or (g) of the present invention to the smectic liquid-crystal composition (G).

EXAMPLE 48

A liquid-crystal composition (J) containing no compounds of the present invention comprises the following components (mol %).

| | |
|---|---|
| 12 | C₁₀H₂₁—O—phenyl—CO—O—phenyl—O—C₃H₆—CH(CH₃)—C₃H₆ |
| 12 | C₈H₁₇—O—pyrimidine—phenyl—O—C₈H₁₇ |
| 10 | C₈H₁₇—pyrimidine—phenyl—O—C₁₀H₂₁ |

-continued

9 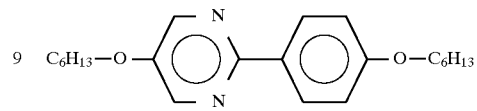

12 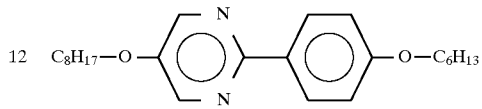

12 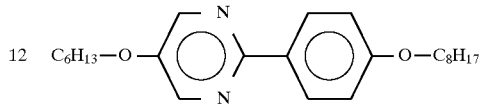

7 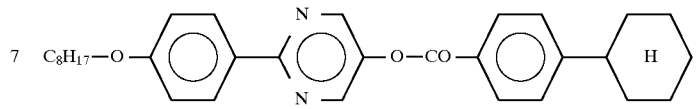

10 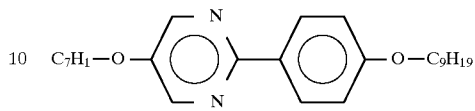

10 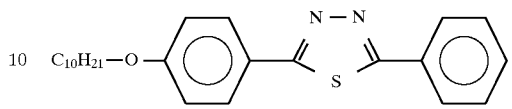

6 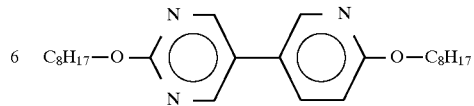

The composition (J) has the following phase sequence:
X 35 $S_C^*$ 71 $S_A$ 88 Ch* 95 I A liquid-crystal composition (K) containing 85% of composition (J) and 15% of the compound (a) of the present invention was prepared.

 (a)

The composition (K) has the following phase sequence:
X −6 $S_C$ 73 $S_A$ 86 Ch 98 I The melting point was lowered by adding the liquid-crystal compound (a) of the present invention to the liquid-crystal composition (J).

Ferroelectric liquid-crystal compositions (L) and (M) were prepared by adding the following compounds to 83% of liquid-crystal compositions (J) and (K) respectively.

5 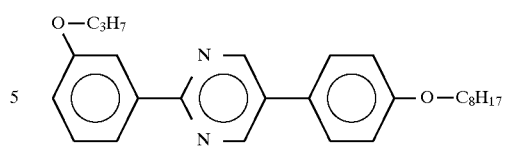

7 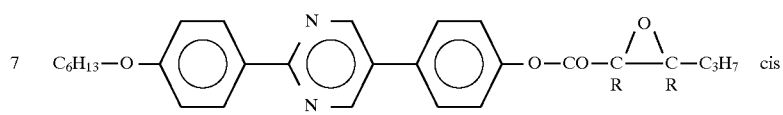 cis

2 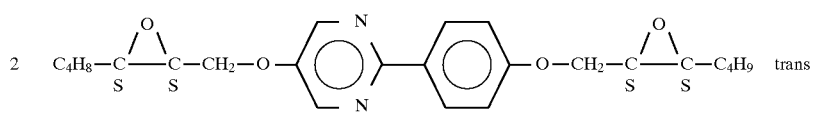 trans

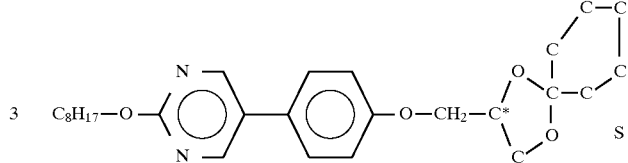

The ferroelectric liquid-crystal compositions (L) and (M) have the following phase sequence:

(L) X −7 $S_C^*$ 73 $S_A$ 90 Ch* 91 I (M) X −13 $S_C^*$ 73 $S_A$ 87 Ch* 92 I

The ferroelectric liquid-crystal composition (M) has a low melting point.

The ferroelectric liquid-crystal composition has a spontaneous polarization of 53 nC/cm², and it can be used for dielectric liquid-crystal display devices, and switches by means of a dipolar pulse.

EXAMPLE 49

A ferroelectric liquid-crystal composition (N) containing 8% of the compound (a) of the present invention comprises the following components (mol %).

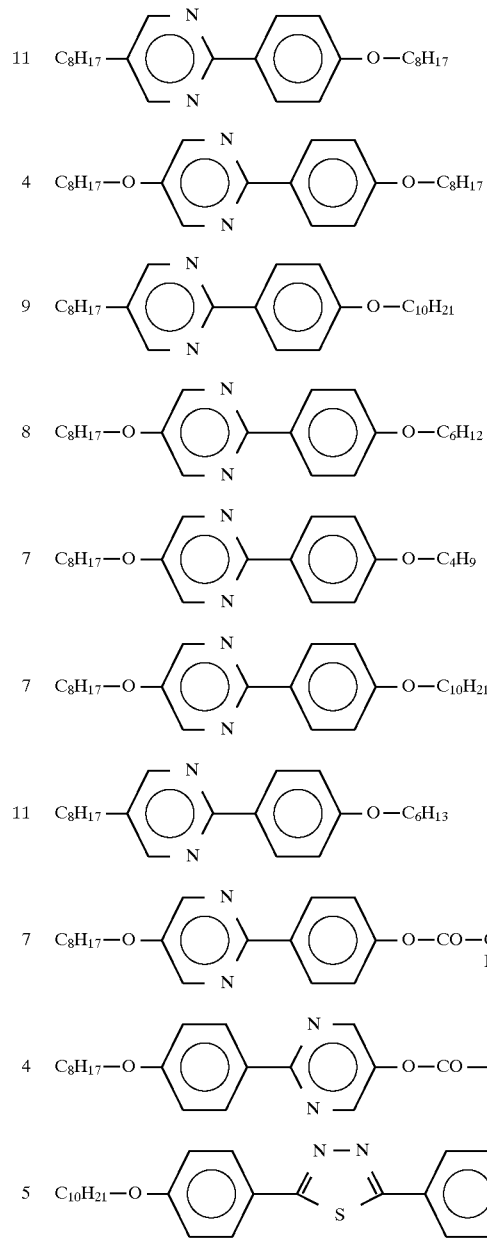

-continued

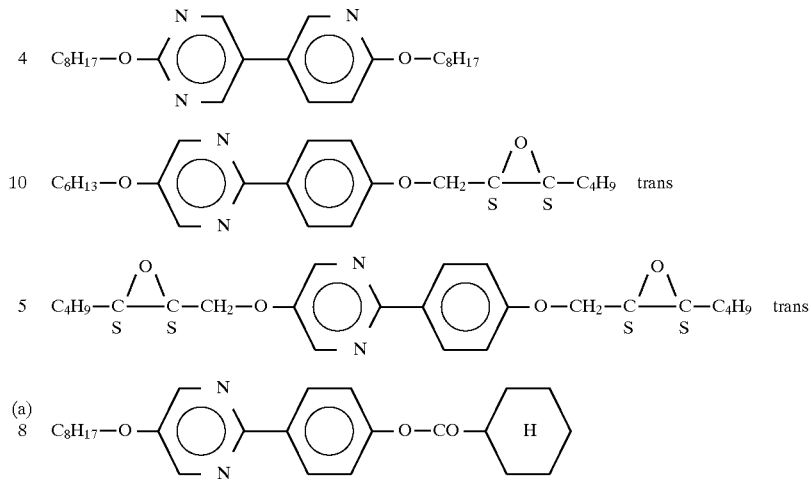

The ferroelectric liquid-crystal composition (N) has the following phase sequence:

X −8 $S_C^*$ 64 $S_A$ 80 Ch* 84 I

The above low melting point was accomplished by the compound of the present invention.

In addition, the ferroelectric liquid-crystal composition (N) of the present invention has a spontaneous polarization of 40 nC/cm², and it can be used for dielectric liquid-crystal display devices, and switches by means of a dipolar pulse.

The above Examples conform that the compounds according to the present invention can be used to prepare smectic or ferroelectric liquid-crystal compositions having a broad temperature range of a smectic C phase, particularly having a broad temperature range in a lower temperature region.

Referential Example 4-(5-Octyloxypyrimidine-2-yl)phenyl 3-cyclohexylpropionate

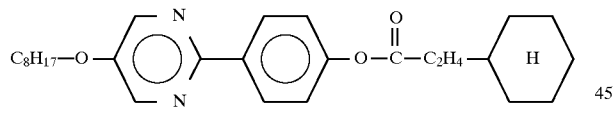

The synthesis was carried out analogously to Example 15.
The compound has the following phase sequence:
X 100 I

What is claimed is:
1. A ferroelectric liquid crystal mixture comprising a compound of the formula (I):

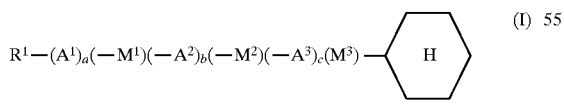

in which the symbols and indices have the following meanings:

$R^1$ is a straight-chain or branched alkyl radical having 1 to 22 carbon atoms (with or without an asymmetrical carbon atom) in which, in addition, it is possible for one or two non-adjacent —CH₂— groups to be replaced by —O—, —CO—, —CO—O—, —O—CO—, —O—CO—O—, or

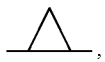

—Si(CH₃)₂—, and in which, in addition, one or more hydrogen atoms of the alkyl radical may be substituted by F, or is one of the chiral groups below:

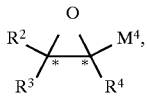

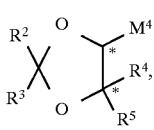

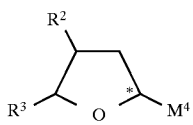

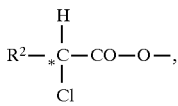

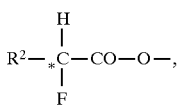

-continued

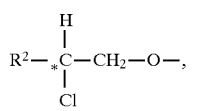

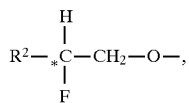

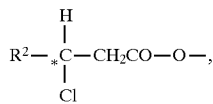

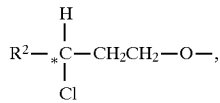

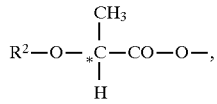

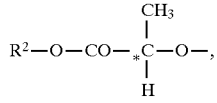

wherein, $R^2$, $R^3$, $R^4$ and $R^5$, independently of one another, are H or a straight-chain or branched alkyl radical having 1 to 22 carbon atoms in which, in addition, it is possible for one or two non-adjacent —CH$_2$— groups to be replaced by —O—, —CO—O—, —O—CO—, or $R^2$ and $R^3$ together may alternatively be —(CH$_2$)$_4$— or —(CH$_2$)$_5$— if they are bonded as substituents to a dioxolane system; and $M^4$ is —CH$_2$—O—, —O—CH$_2$—, —CO—O—, —O—CO— or a single bond;

$A^1$, $A^2$ and $A^3$ are identical or different and are 1,4-phenylene, in which one hydrogen atom may be replaced by F, Cl and/or CN, pyridazine-3,6-diyl, pyridine-2,5-diyl or pyrimidine-2,5-diyl, in which one hydrogen atom may be replaced by F, trans-1,4-cyclohexylene, in which one hydrogen atom may be replaced by —CN, 1,3,4-thiadiazole-2,5-diyl, 1,3-dioxane-2,5-diyl, 1,3-thiazole-2,4-diyl, 1,3-thiazole-2,5-diyl, thiophene-2,4-diyl, thiophene-2,5-diyl, or naphthalene-2,6-diyl;

$M^1$ and $M^2$ are identical or different and are a single bond, —CO—O—, —O—CO—, —O—CO—O—, —CH$_2$—O—, —O—CH$_2$—, —CH$_2$CH$_2$—, —CH=CH— or —C≡C—;

$M^3$ is a single bond or a straight-chain alkyl radical having 1 or 2 carbon atoms in which, in addition, it is possible for one or two non-adjacent —CH$_2$— groups to be replaced by —O—, —CO—O—, —O—CO—, —O—CO—O—, or —CH=CH—, and in which, in addition, one or more hydrogen atoms of the alkyl radical may be substituted by F, with the proviso that $M^3$ is not —O—CO—CH$_2$CH$_2$—;

a, b and c are zero or one, with the proviso that the sum a+b+c is 2 or 3; and

* is a chiral center;

provided however that when $A^1$ and $A^2$ are 1,4-phenylene, $M^1$ and $M^2$ are a single bond, c is zero and $M^3$ is —CO—O—, then $R^1$ is not $C_8H_{17}$—O—.

2. A ferroelectric liquid crystal mixture comprising a compound of the formula (I):

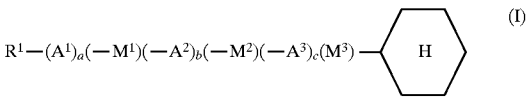

in which the symbols and indices have the following meanings:

$R^1$ is a straight-chain or branched alkyl radical having 1 to 22 carbon atoms (with or without an asymmetrical carbon atom) in which, in addition, it is possible for one or two non-adjacent —CH$_2$— groups to be replaced by —O—, —CO—, —CO—O—, —O—CO—, —O—CO—O—, or

,

—Si(CH$_3$)$_2$—, and in which, in addition, one or more hydrogen atoms of the alkyl radical may be substituted by F, or is one of the chiral groups below:

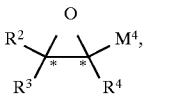

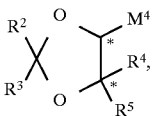

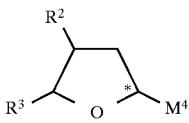

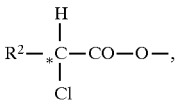

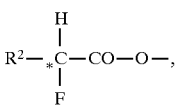

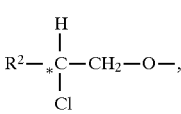

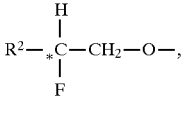

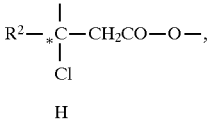

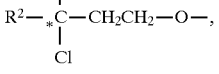

-continued

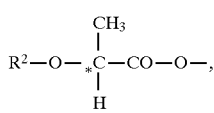

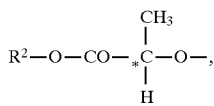

wherein,

R², R³, R⁴ and R⁵, independently of one another, are H or a straight-chain or branched alkyl radical having 1 to 22 carbon atoms in which, in addition, it is possible for one or two non-adjacent —CH₂— groups to be replaced by —O—, —CO—O—, —O—CO—, or R² and R³ together may alternatively be —(CH₂)₄— or —(CH₂)₅— if they are bonded as substituents to a dioxolane system; and M⁴ is —CH₂—O—, —O—CH₂—, —CO—O—, —O—CO— or a single bond;

A¹, A² and A³ are identical or different and are 1,4-phenylene, in which one hydrogen atom may be replaced by F, Cl and/or CN, pyridazine-3,6-diyl, pyridine-2,5-diyl or pyrimidine-2,5-diyl, in which one hydrogen atom is replaced by F, trans-1,4-cyclohexylene, in which one hydrogen atom may be replaced by —CN, 1,3-dioxane-2,5-diyl, 1,3-thiazole-2,4-diyl, 1,3-thiazole-2,5-diyl, thiophene-2,4-diyl, or thiophene-2,5-diyl;

M¹ and M² are identical or different and are a single bond, —CO—O—, —O—CO—, —O—CO—O—, —CH₂—O—, —O—CH₂—, —CH₂CH₂—, —CH=CH— or —C≡C—;

M³ is a single bond or a straight-chain or branched alkyl radical having 1 to 16 carbon atoms in which, in addition, it is possible for one or two non-adjacent —CH₂— groups to be replaced by —O—, —CO—O—, —O—CO—, —O—CO—O—, or —CH=CH—, and in which, in addition, one or more hydrogen atoms of the alkyl radical may be substituted by F, with the proviso that M³ is not —O—CO—CH₂CH₂—;

a, b and c are zero or one, with the proviso that the sum a+b+c is 2 or 3; and

* is a chiral center;

provided however that when A¹ and A² are 1,4-phenylene, M¹ and M² are a single bond, c is zero and M³ is —CO—O—, then R¹ is not C₈H₁₇—O—.

3. A ferroelectric liquid crystal mixture comprising a compound of the formula (I):

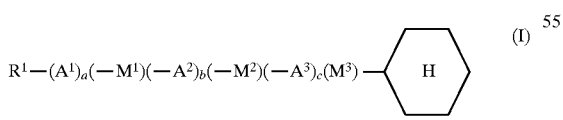

in which the symbols and indices have the following meanings:

R¹ is a straight-chain or branched alkyl radical having 1 to 22 carbon atoms (with or without an asymmetrical carbon atom) in which, in addition, it is possible for one or two non-adjacent —CH₂— groups to be replaced by —O—, —CO—, —CO—O—, —O—CO—, —O—CO—O—, or

—Si(CH₃)₂—, and in which, in addition, one or more hydrogen atoms of the alkyl radical may be substituted by F, or is one of the chiral groups below:

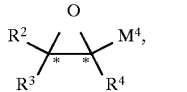

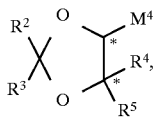

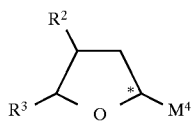

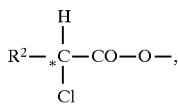

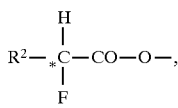

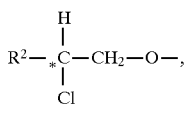

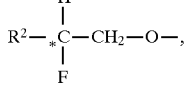

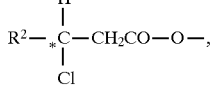

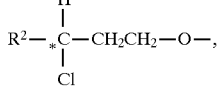

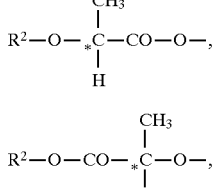

wherein,

R², R³, R⁴ and R⁵, independently of one another, are H or a straight-chain or branched alkyl radical having 1 to 22 carbon atoms in which, in addition, it is possible for one or two non-adjacent —CH₂— groups to be replaced by —O—, —CO—O—, —O—CO—, or R² and R³ together may alternatively be —(CH$_2$)$_4$— or —(CH$_2$)$_5$— if they are bonded as substituents to a dioxolane system; and
M$^4$ is —CH$_2$—O—, —O—CH$_2$—, —CO—O—, —O—CO— or a single bond;
A$^1$, A$^2$ and A$^3$ are identical or different and are 1,4-phenylene, in which one hydrogen atom may be replaced by F, Cl and/or CN, pyridazine-3,6-diyl, pyridine-2,5-diyl or pyrimidine-2,5-diyl, in which one hydrogen atom may be replaced by F, trans-1,4-cyclohexylene, in which one hydrogen atom may be replaced by —CN, 1,3,4-thiadiazole-2,5-diyl, 1,3-dioxane-2,5-diyl, 1,3-thiazole-2,4-diyl, 1,3-thiazole-2,5-diyl, thiophene-2,4-diyl, thiophene-2,5-diyl, or naphthalene-2,6-diyl; with the proviso that at least one of A$^1$, A$^2$ and A$^3$ is pyridazine-3,6-diyl, pyridine-2,5-diyl or pyrimidine-2,5-diyl in which one hydrogen is replaced by F, trans-1,4-cyclohexylene, in which one hydrogen atom is replaced by CN, 1,3-dioxane-2,5-diyl, 1,3-thiazole-2,4-diyl, 1,3-thiazole-2,5-diyl, or thiophene-2,5-diyl;
M$^1$ and M$^2$ are identical or different and are a single bond, —CO—O—, —O—CO—, —O—CO—O—, —CH$_2$—O—, —O—CH$_2$—, —CH$_2$CH$_2$—, —CH=CH— or —C≡C—;
M$^3$ is a single bond or a straight-chain or branched alkyl radical having 1 to 16 carbon atoms in which, in addition, it is possible for one or two non-adjacent —CH$_2$— groups to be replaced by —O—, —CO—O—, —O—CO—, —O—CO—O—, or —CH=CH—, and in which, in addition, one or more hydrogen atoms of the alkyl radical may be substituted by F, with the proviso that M$^3$ is not —O—CO—CH$_2$CH$_2$—;
a, b and c are zero or one, with the proviso that the sum a+b+c is 2 or 3; and
* is a chiral center;
provided however that when A$^1$ and A$^2$ are 1,4-phenylene, M$^1$ and M$^2$ are a single bond, c is zero and M$^3$ is —CO—O—, then R$^1$ is not C$_8$H$_{17}$—O—.

4. A ferroelectric liquid crystal mixture as claimed in claim 1, wherein said compound is selected from the group consisting of the following compounds:

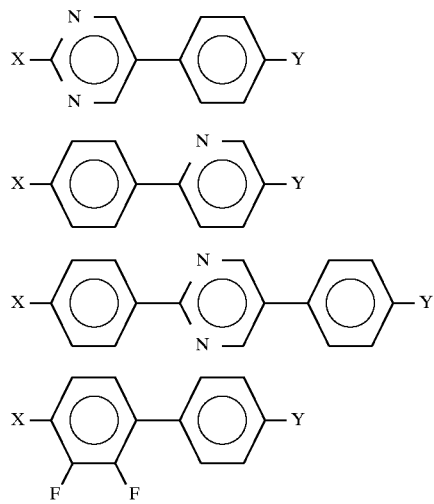

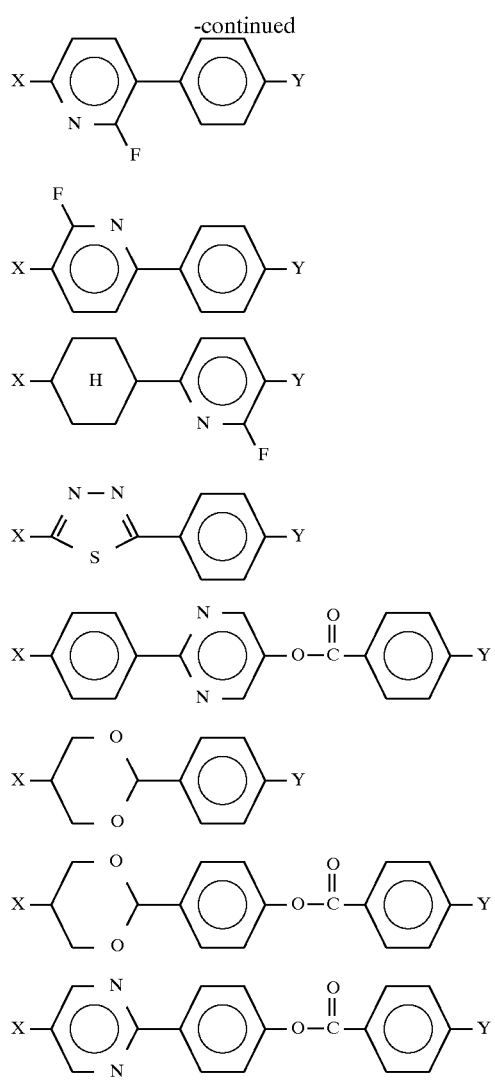

in which either of X and Y is a straight-chain or branched alkyl radical having 1 to 22 carbon atoms, wherein one —CH$_2$— group may be replaced by —O—,

—CH=CH—, —CO—O— or —Si(CH$_3$)$_2$—; and the other is

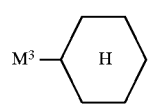

wherein M$^3$ is a single bond, —CO—O—, —O—CO—, —O—CO—C$_n$H$_{2n}$— or —O—C$_n$H$_{2n}$— (wherein n is an integer from 1 to 10).

5. A ferroelectric liquid crystal mixture as claimed in claim 2, wherein said compound is selected from the group consisting of the following compounds:

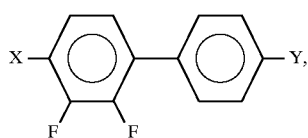

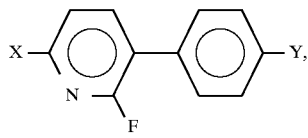

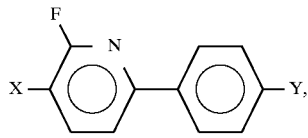

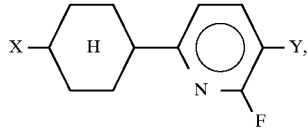

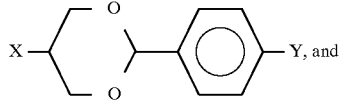

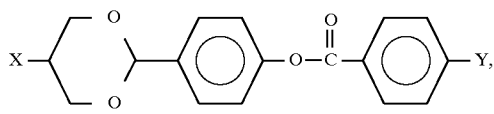

in which either of X and Y is a straight-chain or branched alkyl radical having 1 to 22 carbon atoms, wherein one —CH$_2$— group may be replaced by —O—,

,

—CH=CH—, —CO—O— or —Si(CH$_3$)$_2$—; and the other is

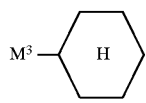

wherein M$^3$ is a single bond, —CO—O—, —O—CO—, —O—CO—C$_n$H$_{2n}$— or —O—C$_n$H$_{2n}$— (wherein n is an integer from 1 to 10).

6. A ferroelectric liquid crystal mixture as claimed in claim 3, wherein said compound is selected from the group consisting of the following compounds:

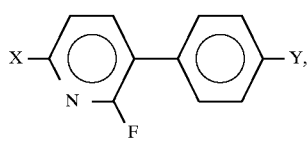

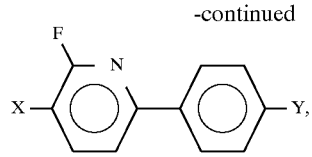

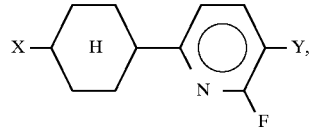

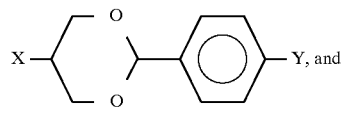

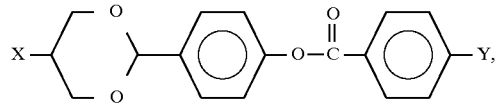

in which either of X and Y is a straight-chain or branched alkyl radical having 1 to 22 carbon atoms, wherein one —CH$_2$— group may be replaced by —O—,

,

—CH=CH—, —CO—O— or —Si(CH$_3$)$_2$—; and the other is

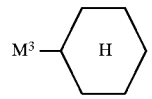

wherein M$^3$ is a single bond, —CO—O—, —O—CO—, —O—CO—C$_n$H$_{2n}$— or —O—C$_n$H$_{2n}$— (wherein n is an integer from 1 to 10).

7. The ferroelectric liquid crystal mixture as claimed in claim 1, in which the group —(A$^1$)$_a$(—M$^1$) (—A$^2$)$_b$(—M$^2$) (—A$^3$)$_c$ in the formula (I) is one of the following groups:

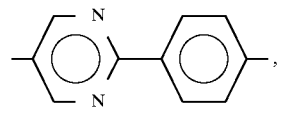

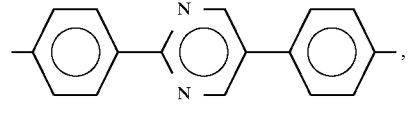

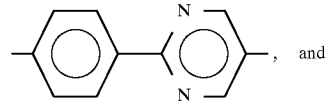, and

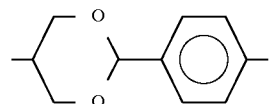

-continued
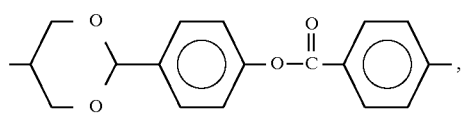
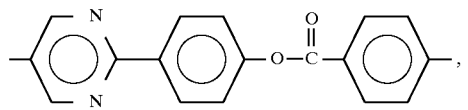
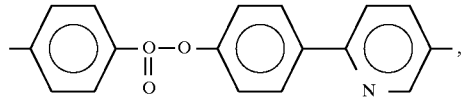
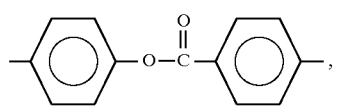
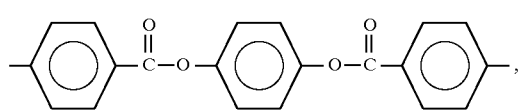
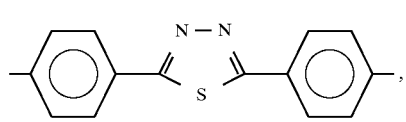
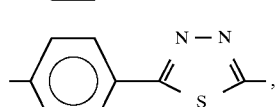
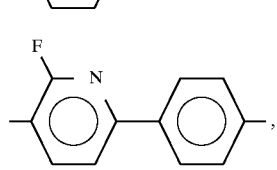
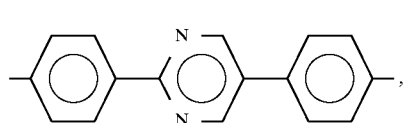
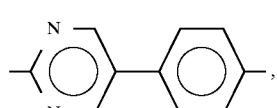
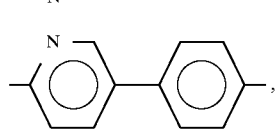
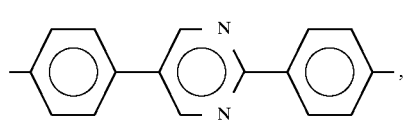
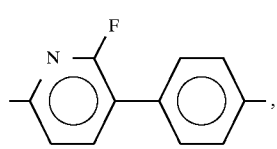
-continued
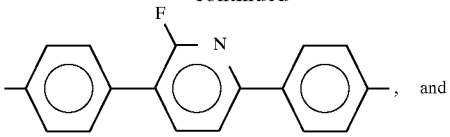, and
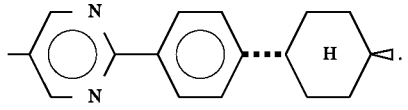.
8. The ferroelectric liquid crystal mixture as claimed in claim 2, in which the group
—(A$^1$)$_a$(—M$^1$) (—A$^2$)$_b$(—M$^2$) (—A$^3$)$_c$
in the formula (I) is one of the following groups:
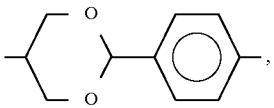,
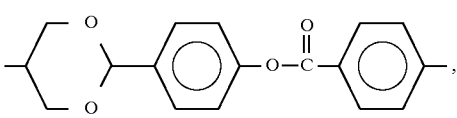,
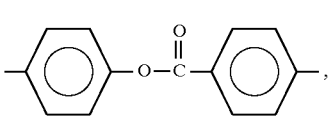,
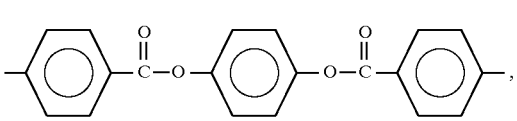,
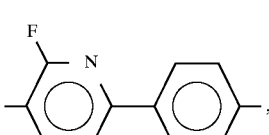,
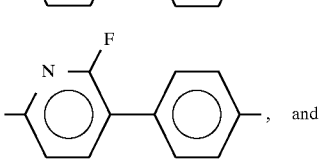, and
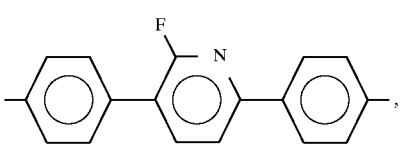,
9. The ferroelectric liquid crystal mixture as claimed in claim 3, in which the group
—(A$^1$)$_a$(—M$^1$) (—A$^2$)$_b$(—M$^2$) (—A$^3$)$_c$
in the formula (I) is one of the following groups:
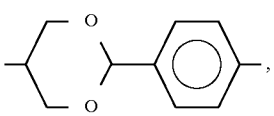, -continued
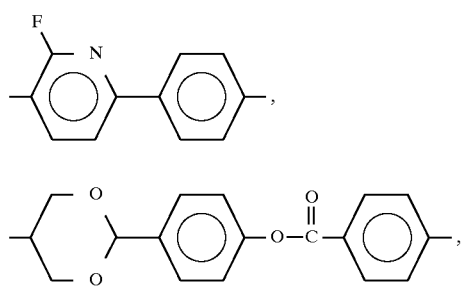
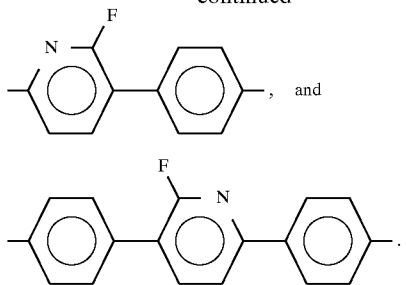
* * * * *